US009225858B2

(12) United States Patent
Anderson et al.

(10) Patent No.: US 9,225,858 B2
(45) Date of Patent: Dec. 29, 2015

(54) SYSTEMS AND METHODS FOR LOCATION-AWARE IMAGING DEVICES

(71) Applicants: John Douglas Anderson, Lexington, KY (US); Forrest Lane Steely, Lexington, KY (US)

(72) Inventors: John Douglas Anderson, Lexington, KY (US); Forrest Lane Steely, Lexington, KY (US)

(73) Assignee: LEXMARK INTERNATIONAL, INC., Lexington, KY (US)

(*) Notice: Subject to any disclaimer, the term of this patent is extended or adjusted under 35 U.S.C. 154(b) by 115 days.

(21) Appl. No.: 14/040,811

(22) Filed: Sep. 30, 2013

(65) Prior Publication Data

US 2015/0092226 A1  Apr. 2, 2015

(51) Int. Cl.
  *G08B 1/08*  (2006.01)
  *H04N 1/00*  (2006.01)
  *G06Q 10/08*  (2012.01)
  *G06Q 10/06*  (2012.01)
  *G06Q 50/28*  (2012.01)

(52) U.S. Cl.
  CPC ........... *H04N 1/00323* (2013.01); *G06Q 10/06* (2013.01); *G06Q 10/08* (2013.01); *G06Q 50/28* (2013.01); *H04N 1/00244* (2013.01); *H04N 1/00344* (2013.01)

(58) Field of Classification Search
  CPC .................................................. H04N 1/00323
  USPC ...................................................... 340/539.13
  See application file for complete search history.

(56) References Cited

U.S. PATENT DOCUMENTS

| | | | |
|---|---|---|---|
| 5,804,810 A * | 9/1998 | Woolley et al. | 235/492 |
| 6,493,649 B1 | 12/2002 | Jones | |
| 7,323,991 B1 * | 1/2008 | Eckert et al. | 340/572.1 |
| 7,511,662 B2 | 3/2009 | Mathews | |
| 7,693,757 B2 | 4/2010 | Zimmerman | |
| 7,903,029 B2 | 3/2011 | Dupray | |
| 7,960,973 B2 | 6/2011 | Zeller | |
| 8,344,949 B2 | 1/2013 | Moshfeghi | |
| 8,369,981 B2 * | 2/2013 | Dunsker et al. | 700/214 |
| 8,373,562 B1 | 2/2013 | Heinze | |
| 8,378,789 B2 | 2/2013 | Moore | |
| 2011/0208567 A9 * | 8/2011 | Roddy et al. | 705/7.41 |

* cited by examiner

*Primary Examiner* — Kerri McNally

(57) ABSTRACT

Methods and systems for tracking locations of a plurality of devices includes initializing a server with a site floor plan, receiving ranging information transmitted by one or more devices of the plurality of devices at the server, creating a multi-dimensional map of locations of the plurality of devices based on ranging information using a location engine, and calibrating the multi-dimensional map of locations to the site floor plan calibrated with geospatial coordinates. Upon movement of a device from a first to a second location, ranging information changes between devices and maps, relative locations and absolute locations are updated.

20 Claims, 9 Drawing Sheets

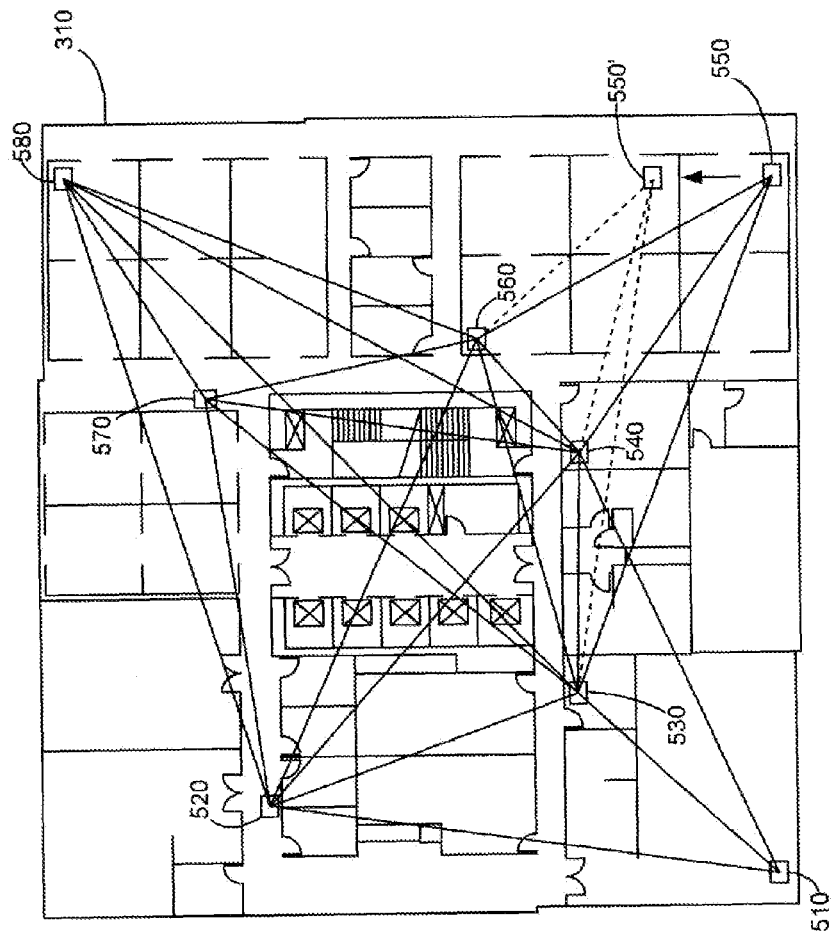

SYSTEMS AND METHODS FOR LOCATION-AWARE IMAGING DEVICES

BACKGROUND

1. Technical Field

The present disclosure generally relates to locating systems, and, more particularly, to systems and methods for locating multiple devices in a customer location.

2. Description of the Related Art

Many companies are taking managed print services (MPSs) from printer manufacturers and/or MPS providers to help manage their growing fleet of equipment and output devices such as copiers, printers, multi-function devices, and any other imaging device. An MPS is typically implemented with a network-enabled tool that comes in the form of software that monitors the status of each imaging device including print volumes, paper and ink/toner levels, availability, working condition, and location within company premises. By knowing the status of each imaging device, an MPS can respond properly to specific needs, such as generating automatic orders to replace near-empty supply items, and promptly sending personnel to imaging devices requiring servicing once malfunctions or other types of failures are detected.

Often, billing rates are partially dependent on equipment uptime such that MPS providers have vested interest in maximizing it which in turn requires minimizing the time required to dispatch service technicians and accomplish the required services. In some cases, a major impediment to rapid service is the difficulty experienced by the service technician in actually locating equipment requiring service. This introduces hidden cost of time wasted when a piece of equipment is awaiting maintenance.

In order to keep track of each imaging device in a fleet, some practices for MPS include manually recording imaging device location information in a database. Location information may include, but are not limited to street address of the customer location, building floor on which the imaging devices are located, room names and/or numbers. However, such information may become inaccurate if the imaging devices are relocated without notifying the MPS provider and/or updating the database in light of the changes. In still some other cases, floor plans are received from customers and proposed locations of imaging devices are supplied to the customers using the floor plans. However, these proposed locations are not always followed and no post-installation verification indicating the actual locations of the imaging devices are often given to the MPS provider. As a result, a service technician, when dispatched to service an imaging device, may be given information that is inaccurate or ambiguous. Once onsite, the technician may spend considerable time locating the correct imaging device for servicing.

Accordingly, there is a need for a method and system that keeps real-time visibility of exact locations of imaging devices in a customer location.

SUMMARY

Methods and systems for tracking locations of a plurality of devices includes initializing a server with a site floor plan, receiving ranging information transmitted by one or more devices of the plurality of devices at the server, creating a multi-dimensional map of locations of the plurality of devices based on ranging information using a location engine, and calibrating the multi-dimensional map of locations to the site floor plan calibrated with geospatial coordinates. Upon movement of a device from a first to a second location, ranging information changes between devices and maps, relative locations and absolute locations are updated.

Other embodiments, objects, features and advantages of the disclosure will become apparent to those skilled in the art from the detailed description, the accompanying drawings and the appended claims.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

FIGS. 8 and 9 illustrate the two-dimensional grid of imaging devices in FIG. 5 as superimposed on the floor plan of FIG. 6, respectively, including a new or moved location of an imaging device and its new position or distance relationship between the remaining imaging devices.

DETAILED DESCRIPTION OF THE DRAWINGS

Figure 1:
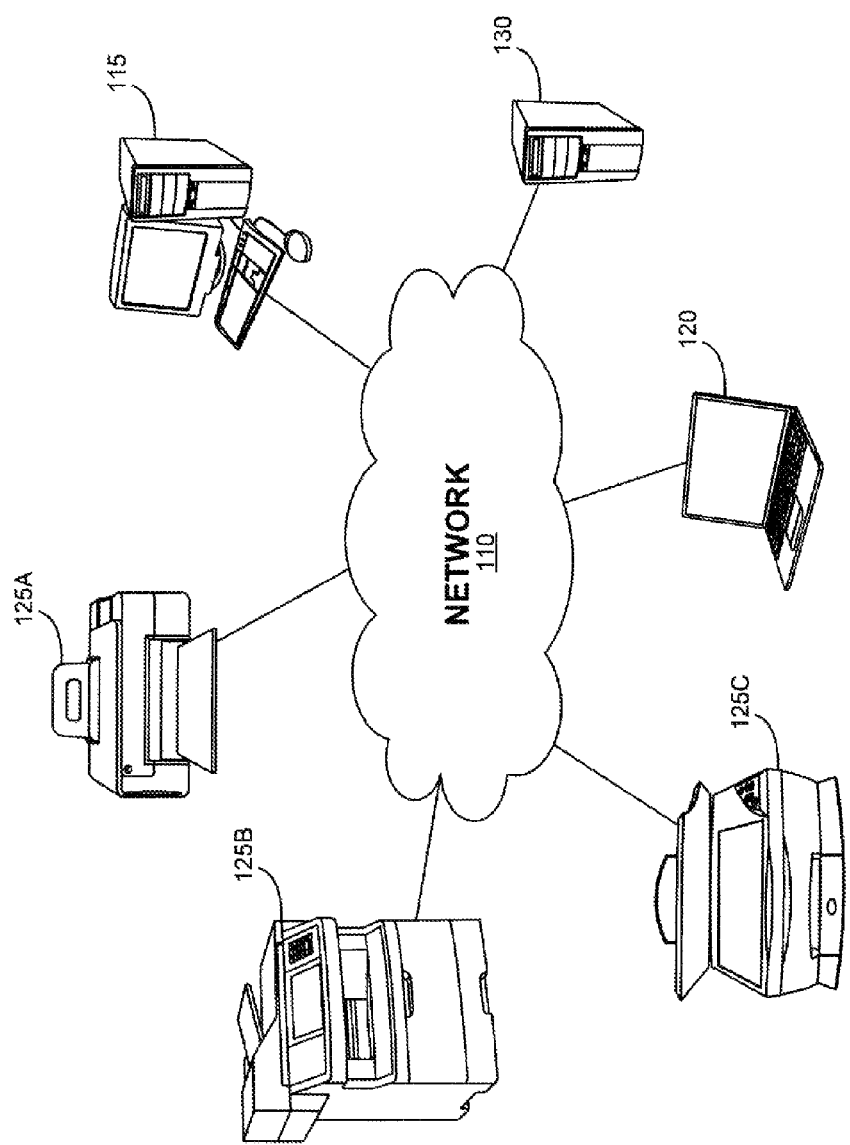
FIG. 1 illustrates a network interconnecting a plurality of devices.

The following description and drawings illustrate example embodiments sufficiently to enable those skilled in the art to practice the present disclosure. It is to be understood that the disclosure is not limited to the details of construction and the arrangement of components set forth in the following description or illustrated in the drawings. The disclosure is capable of other embodiments and of being practiced or of being carried out in various ways. For example, other embodiments may incorporate structural, chronological, electrical, process, and other changes. Examples merely typify possible variations. Individual components and functions are optional unless explicitly required, and the sequence of operations may vary. Portions and features of some embodiments may be included in or substituted for those of others. The scope of the application encompasses the appended claims and all available equivalents. The following description is, therefore, not to be taken in a limited sense, and the scope of the present disclosure is defined by the appended claims.

It will be understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block of the diagrams or combinations of blocks in the diagrams discussed in detail in the description below.

These computer program instructions may also be stored in a non-transitory computer-readable memory that may direct a computer or other programmable data processing apparatus to function in a particular manner, such that the instructions stored in the computer-readable memory produce an article of manufacture including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks.

Accordingly, blocks of the diagrams support combinations of means for performing the specified functions, combinations of steps for performing the specified functions and program instruction means for performing the specified functions. It will also be understood that each block of the diagrams, and combinations of blocks in the diagrams, can be implemented by special purpose hardware-based computer systems that perform the specified functions or steps, or combinations of special purpose hardware and computer instructions.

Disclosed are systems and methods for tracking locations of multiple devices within a customer location. A customer location may be defined as a physical site or location specified by a customer where its operations take place such as buildings or infrastructures, including surrounding campuses and/or satellite offices, etc. The customer location may be equipped with a mix of different devices, including imaging devices, distributed at various locations and made accessible to different users. In one example embodiment, the imaging devices within the customer location may be configured to create a self-maintained ecosystem of imaging devices that can detect and report positions and movement of any individual imaging device within the ecosystem. The imaging devices in the ecosystem communicate with each other to generate ranging information and, thereafter, send the ranging information to a server for processing. In turn, the server calculates the exact location of each imaging device relative to each other using the ranging information. In one aspect, the server overlays the location of each imaging device with a customer location floor plan calibrated with geospatial coordinates. In this way, the location of each device is calibrated to the floor plan as well as with geospatial coordinates such that accurate device location may be provided to a service technician when dispatched to service an imaging device requiring maintenance. Additionally, a real-time monitoring and tracking system for imaging devices may also be provided without requiring external devices, such as access points or beacons, to determine the exact locations of each imaging device. Instead, the monitoring or tracking system may only depend upon the imaging devices themselves to detect and locate each other.

Referring now to the drawings, and particularly to FIG. 1, there is shown an illustration of a network 110 which interconnects a plurality of devices within a customer location. Network 110 may have any one of a number of network topologies and signal protocols, and may be any type of network, including a local area network (LAN), a wide area network (WAN), a metropolitan area network (MAN), or any other type of network capable of interconnecting network devices. Network devices may include a workstations 115, laptops 120, imaging devices 125, and a network server 130, each connected to network 110 through associated interface devices, such as network interface cards (NICs). Electronic communication between devices may operate using a wired connection, such for example, using Ethernet UTP or fiber optic cables, or a wireless networking standard, such as IEEE 802.XX.

Network server 130 may be a web server and/or a managed print service (MPS) location server provided to manage all interconnected peripheral network devices, more particularly imaging devices 125, within network 110. MPS location server 130 may include a database which may be used to store information associated with the interconnected imaging devices such as, for example, IP or MAC addresses, status information, operation logs, or location information.

According to an example embodiment, MPS location server 130 may update the information of the database if the imaging devices have changes in their states. For example, MPS server 130 may update information associated with a particular imaging device relating to its current location. In an example embodiment, information relating to the location of the imaging device, such as for example, building name, floor number, room number, etc., may be retrieved from MPS location server 130 and provided to a user, when requested. In one aspect, the location information may be provided to the user in the form of a text description of the location. In another aspect, a floor plan indicating the location of the imaging device may be displayed on a user interface screen, such as for example, on a computer monitor or on a handheld device. In order for the location information stored in the database to be accurate, MPS location server 130 may constantly monitor changes in locations of the imaging devices and accordingly update the location information once changes occur.

According to an example embodiment of the present disclosure, MPS location server 130 may depend on the imaging devices to detect each other in order to determine the exact location of each imaging device. Each imaging device may scan for other imaging devices within range and produce ranging information or position data that includes, for example, distance calculations/estimations between itself and the other imaging devices within range. The imaging devices may then forward the ranging information containing distance estimations to MPS location server 130 for processing. In turn, MPS location server 130 may calculate the exact location of each imaging device using the collected ranging information.

Figure 2:
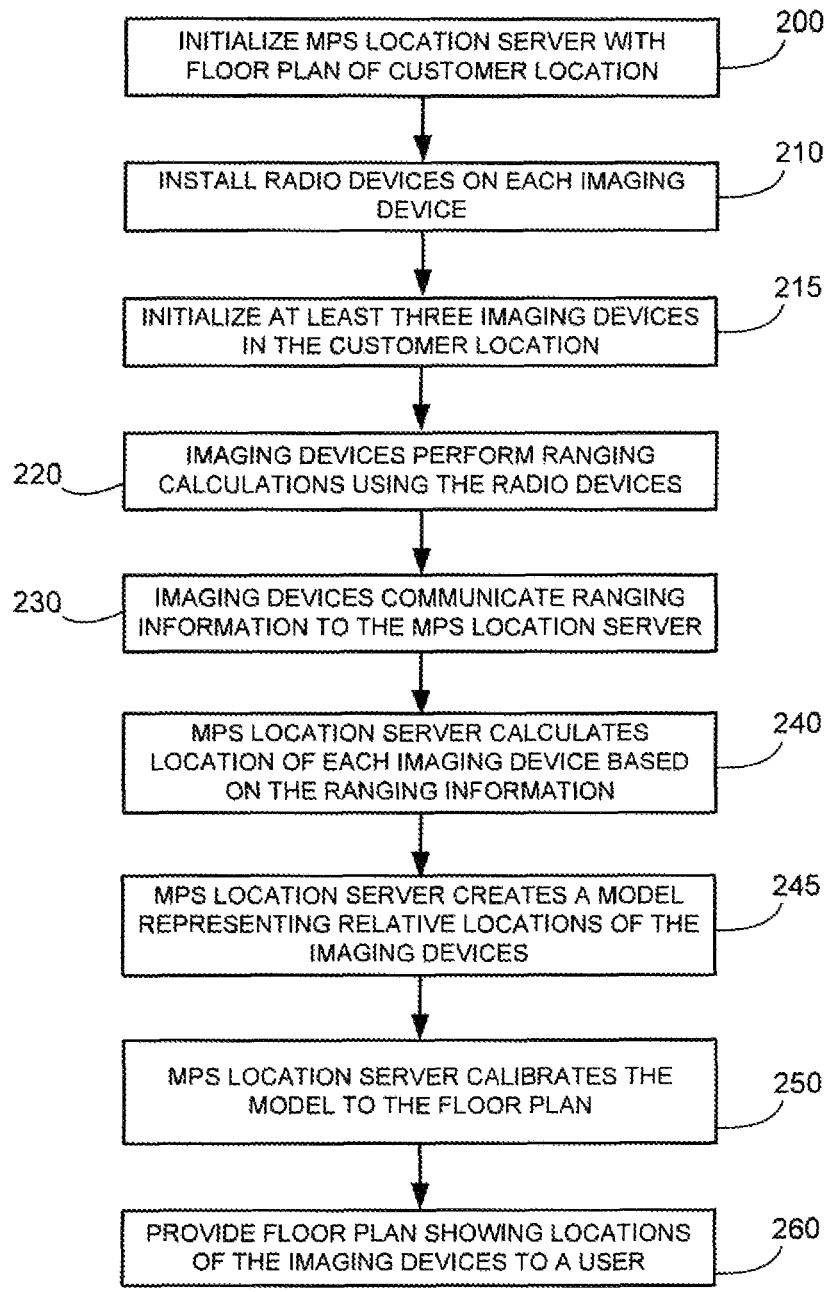
FIG. 2 is a flowchart illustrating one example embodiment of tracking locations of imaging devices within a customer location.
Figure 3:
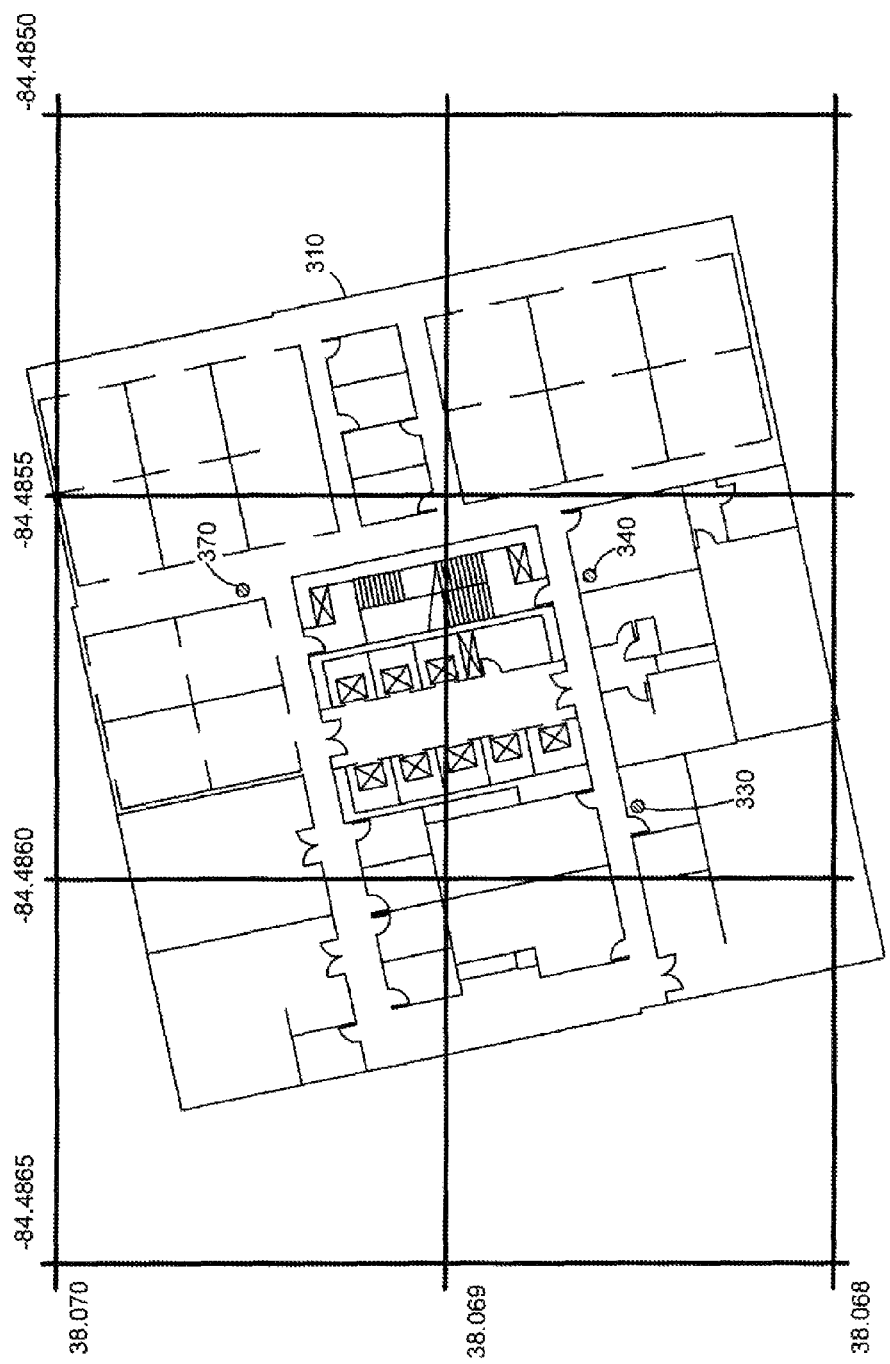
FIG. 3 illustrates a floor plan calibrated with geospatial coordinates.

Referring now to FIG. 2, there is shown a flowchart illustrating one example method of tracking, monitoring, or determining exact locations of imaging devices within a customer location. At block 200, MPS location server may be initialized with a map of the customer premise. For example, the map may be a floor plan 310, as shown in FIG. 3, that shows and lays out the arrangement of rooms and spaces at a particular level or floor of a building. In the case where the customer location includes a multi-story building, MPS location server 130 may be initialized with floor plans of each floor of the multi-story building.

In an example embodiment, floor plan 310 may be calibrated with geospatial coordinates. Geospatial coordinates may include geospatial attributes such as longitude and latitude pairs, and/or altitude (for multi-story buildings). In one example aspect, a GPS equipment may be used to establish geospatial reference coordinates on the floor plan. For example, a GPS device may be taken to various locations or corners within a building. At each location, the GPS device may communicate with a GPS satellite to obtain geospatial coordinate values at the current location. The acquired values may then be used to establish geospatial reference coordinates on the floor plan. In other example aspects, geospatial information may be obtained by surveying the site, airborne or satellite mapping, or any other technique that can be employed to determine and obtain geospatial information.

At block 210, the imaging devices may be provided with radio devices, such as radio transceivers or transponders, upon initial installation in the customer location. The radio devices may be used to facilitate location determination operations, as will be explained in greater detail below. In one example embodiment, the radio devices may be derived from a wide variety of local positioning systems, such as Real-Time Location Systems (RTLS), which incorporate a wide variety of RF frequencies, such as for example, 433 MHz, 915 MHz, 2.4 GHz, and 3-10 GHz. Signals and waveforms used in RTLS may be continuous waves or pulse waves. RTLS methods and protocols that may be used may include, but are not limited to, ZigBee, RuBee, 6LoWPAN, DASH7, Wi-Fi, and UWB (Ultra-wideband).

Each radio device may include an antenna and a circuit that is configurable to operate as a transmitter and a receiver. In addition, each radio device may also include a backup power source, such as a battery, so that radio devices may continue to function in the event associated imaging devices are powered off or lose power due to power interruptions or hardware failure.

At block 220, after installation, the radio devices may periodically transmit identifying radio signals and perform distance measuring processes to produce ranging information. The ranging information may be used by MPS location server 130 to calculate the exact locations of each imaging device in the customer location, as will be explained in detail below.

RTLS systems typically use stationary readers, beacons or access points to receive wireless signals from badges or tags attached to objects in order to produce ranging information and determine the locations of the objects, i.e., the objects are referenced relative to the fixed access points. In most customer locations, however, it may be advantageous to implement a system that does not add additional infrastructure to the customer premise. Since the imaging devices themselves are fairly stationary types of devices and do not move very often, they may be used as fixed reference points and can be used to detect each other, according to one example embodiment. For example, when any one of the imaging devices moves, other imaging devices may detect the moving imaging device. This may create a self-maintained ecosystem of imaging devices that can detect and report movement of any individual imaging device. No access points are thus necessary and the system is completely dependent upon the imaging devices themselves in conducting location detection.

Figure 4:
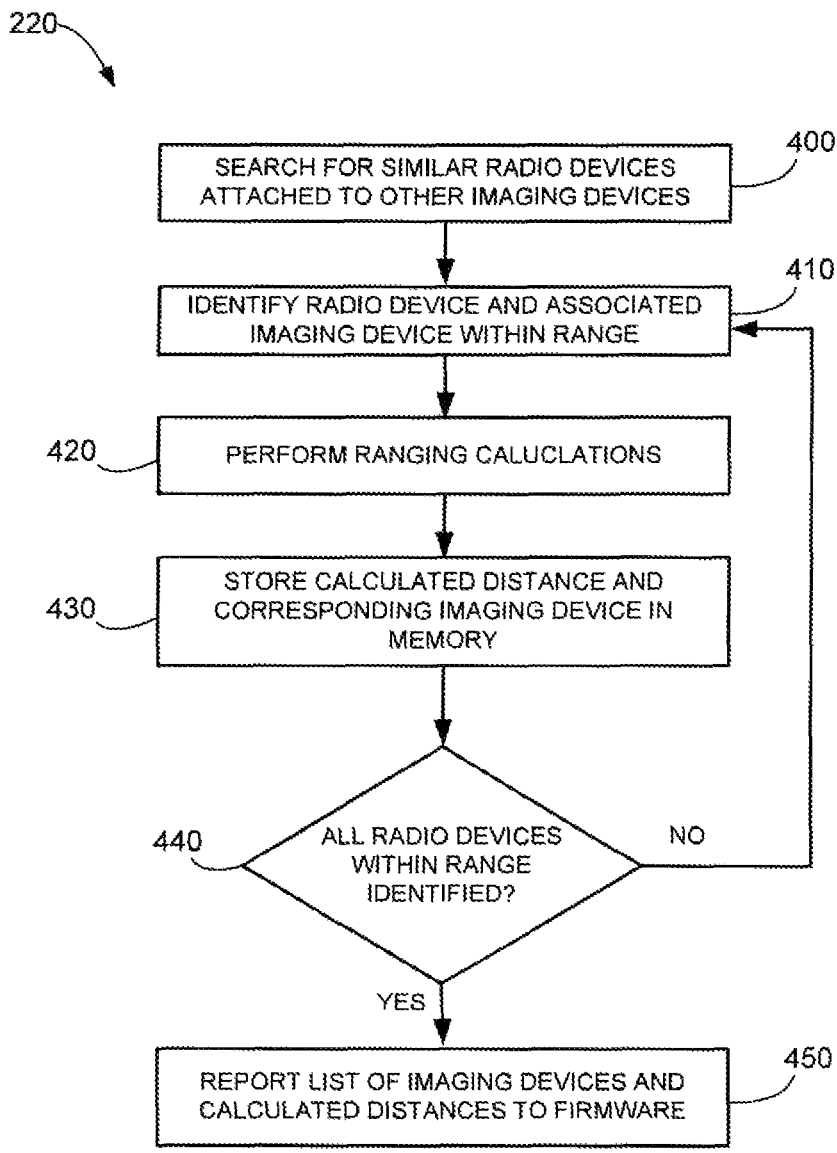
FIG. 4 is a flowchart illustrating one example embodiment of a method of obtaining ranging information.

FIG. 4 illustrates one example embodiment of how each of the imaging devices may obtain ranging information without requiring external devices such as readers, access points, and beacons. At block 400, a first radio device associated with a first imaging device may search for other similar radio devices within range. In one example aspect, the first radio device may broadcast a radio signal within a broadcast range. A second radio device associated with a second imaging device within the broadcast range of the first radio device may receive the broadcast radio signal. Accordingly, the second radio device may transmit a response signal containing identifying information to the first radio device. The identifying information may include radio device identification and information related to the associated imaging device.

At block 410, the first radio device may receive the response signal and identify the second radio device and its associated imaging device. The first radio device may also extract other information, such as timing information, signal strength of the response signal, or other values or parameters that can be used to derive ranging information.

At block 420, the first radio device may perform ranging calculations to accurately determine the distance between itself and the second radio device using the information extracted from the response signal. A variety of existing calculation methods may be used including, but are not limited to, RSSI (Received Signal Strength Indicator), TOA (Time of Arrival), DOA (Time Delay of Arrival), TOF (Time of Flight), RTT (Round Trip Time), and SDS-TWR (Symmetrical Double Sided Two Way Ranging). At block 430, the second radio device may store the calculated distance along with the imaging device associated with it in a memory.

At block 440, the first radio device may determine whether all other similar radio devices within its range have been identified. Upon a negative determination, the process branches back to block 410 where the first radio device identifies other unidentified radio devices. Thus, the process flow from block 410 to block 440 may be repeated by the first radio device until all similar radios within range have been identified.

After communicating with other similar radio devices within range and collecting a list of imaging devices and their respective distances, the first radio device may report the list to the firmware of the imaging device it is associated with, at block 450. In one aspect, the imaging device firmware may be configured to receive location information, including the list of imaging devices and ranging information, from the RTLS radio devices. In another aspect, the imaging device may have a software program (such as an ESF application) installed and configured to receive location information from the RTLS radio devices.

Figure 5:
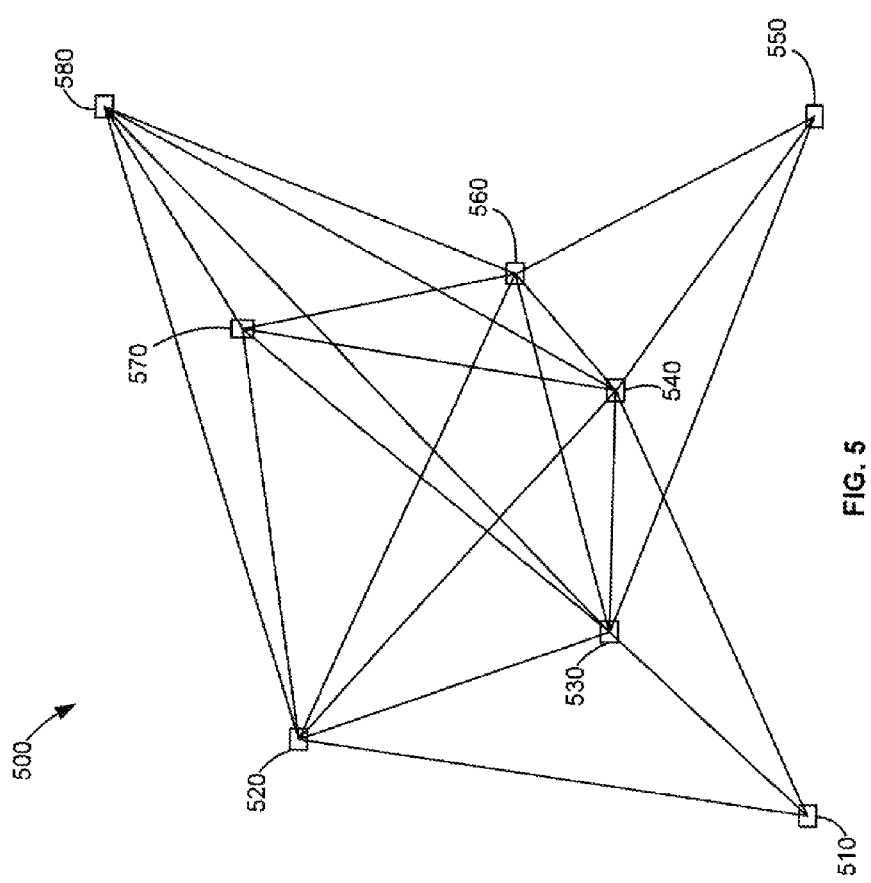
FIG. 5 illustrates a two-dimensional grid that shows position or distance relationship between imaging devices.

It will be appreciated that since detection of surrounding radio devices is dependent on the range of a radio device, an imaging device may not be able to detect all other imagine devices in the customer location, especially those outside the range of its associated radio device. However, it may not be necessary for a single imaging device to detect every single imaging device in the customer location. For example, FIG. 5 illustrates imaging devices 510, 520, 530, 540, 550, 560, 570, and 580 positioned at various locations within a customer location. Even though imaging device 580 is not detectable by imaging device 510 due to broadcast range limitations, noise interferences, or other factors, other imaging devices within the coverage of imaging device 510, such as imaging devices 520, 530, and 540, may detect imaging device 580. As such, the imaging devices in the customer location may not be able to directly detect each other, but may still be connected to each other indirectly. It will also be appreciated that any ranging technology or combination of technologies may be employed, so long as ranging information is automatically determined.

Referring back to FIG. 2, each imaging device may communicate the ranging information received from corresponding radio devices to MPS location server 130 (block 230). At block 240, MPS location server 130 may calculate the location of each imaging device in the customer location based on ranging information reported by each imaging device. In one example embodiment, MPS location server 130 may include a location engine that takes the ranging information from the imaging devices and utilizes the information to create a multi-dimensional grid or model that indicates the relative locations of the imaging devices with respect to each other. FIG. 5 illustrates art example two-dimensional model 500 that shows position or distance relationship between imaging devices 510, 520, 530, 540, 550, 560, 570, and 580.

Figure 6:
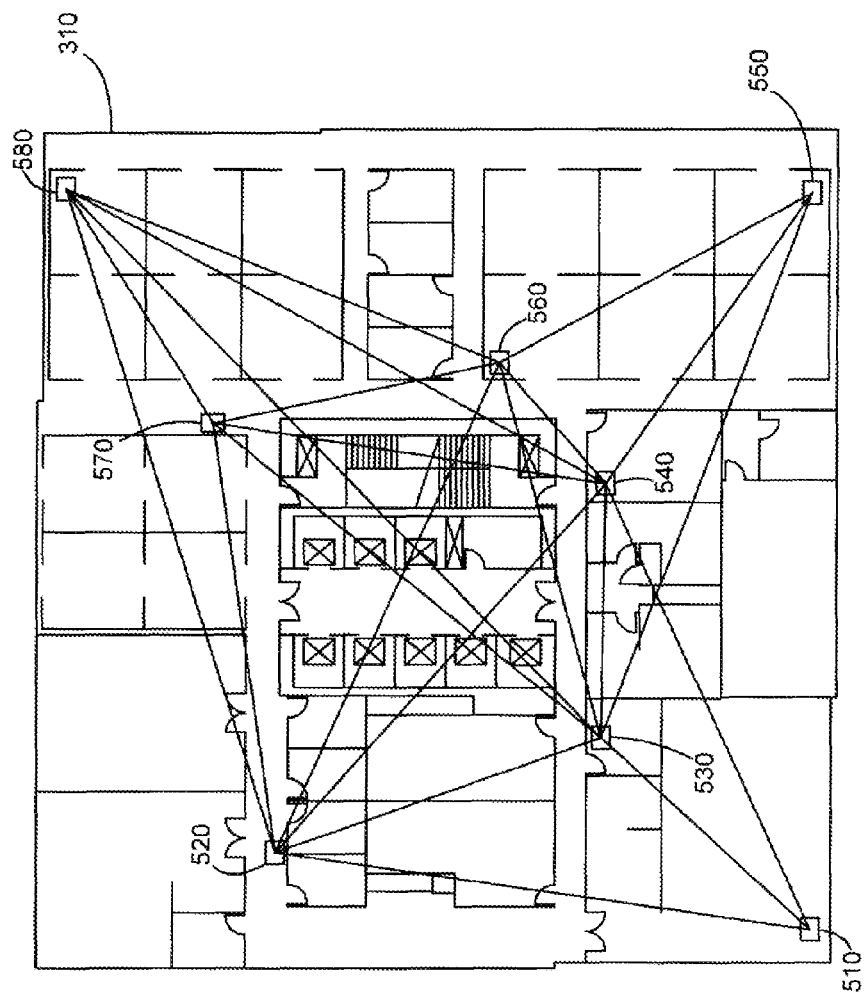
FIG. 6 illustrates the two-dimensional grid in FIG. 5 superimposed on the floor plan in FIG. 3.

At block 250, MPS location server 130 may calibrate the location of each imaging device to the floor plan. In one example embodiment, the MPS location server may superimpose or overlay the multi-dimensional model of relative imaging device locations to the calibrated floor plan. FIG. 6 illustrates the two-dimensional model 500 in FIG. 5 superimposed on the floor plan 310 shown in FIG. 3. As a result, the locations of imaging devices 510, 520, 530, 540, 550, 560, 370, and 580 are calibrated to the floor plan 300 as well as to the geospatial coordinates.

In order for the points corresponding to the imaging devices in the two-dimensional model 500 to coincide correctly with the actual locations of the imaging devices with respect to the floor plan, at least two of the imaging devices in the customer location may be calibrated to the floor plan upon initial installation. For example, two imaging devices 530 and 570 (FIG. 5) may be plotted against the floor plan 310 as two reference points 330 and 370 (FIG. 3). Doing so, MPS location server 130 is made initially aware of the exact locations of the two imaging devices 530 and 570 relative to the floor plan 310. During superimposition, the two points in the two-dimensional model corresponding to the same two imaging devices 530 and 570 may be substantially matched with the floor plan 310 to occupy the same space or location as the two reference points 330 and 370, respectively. In this way, the two-dimensional model 500 may be superimposed on the floor plan 310 at a proper angle or orientation such that each point on the model 500 may accurately correspond to the exact locations of each imaging device with respect to the floor plan 310.

In an alternative example embodiment, a single imaging device may be calibrated to the floor plan upon initial installation such that its absolute location is the only location known by MPS location server 130. In such a case, the radio device associated with that single imaging device may have to be equipped with position detection sensors. For example, the radio device may determine the distances, positions, and orientations in space of surrounding radio devices within range, relative to itself. In one aspect, the radio device may calculate the longitude/latitude points of the other radio devices within range, and pass the location information, including the longitude/latitude points, to MPS location server 130. When MPS location server 130 overlays the model to the floor plan, MPS location server 130 may utilize at least one longitude/latitude point associated with another imaging device as a reference point in addition to the fixed reference point corresponding, to the singly calibrated imaging device.

For example, imaging device 540 (FIG. 5) may be plotted against the floor plan 310 as a reference point 340 (FIG. 3). In the detection stage, imaging device 540 may determine the longitude/latitude point of imaging device 520. During superimposition, the point in the model 500 corresponding to imaging device 540 may be substantially matched to occupy the same space and location as reference point 340 on the floor plan 310. In addition, the longitude/latitude point of imaging device 520 may also be matched to the geospatial coordinates of the calibrated floor plan 310. As such, two points are matched so that overlaying of the model onto the floor plan may be established at a proper angle or orientation. Once the singly calibrated imaging device is used to establish a relationship between the absolute and relative location of the entire set of devices, movement of individual devices can thereafter take place. Movement, however, may require further calibration between devices, floor plans, absolute and relative locations.

Once the MPS location server has calibrated the exact location of each imaging device to the floor plan and to the geospatial coordinates, the floor plan may be provided to a user upon request (block 260).

Figure 7:
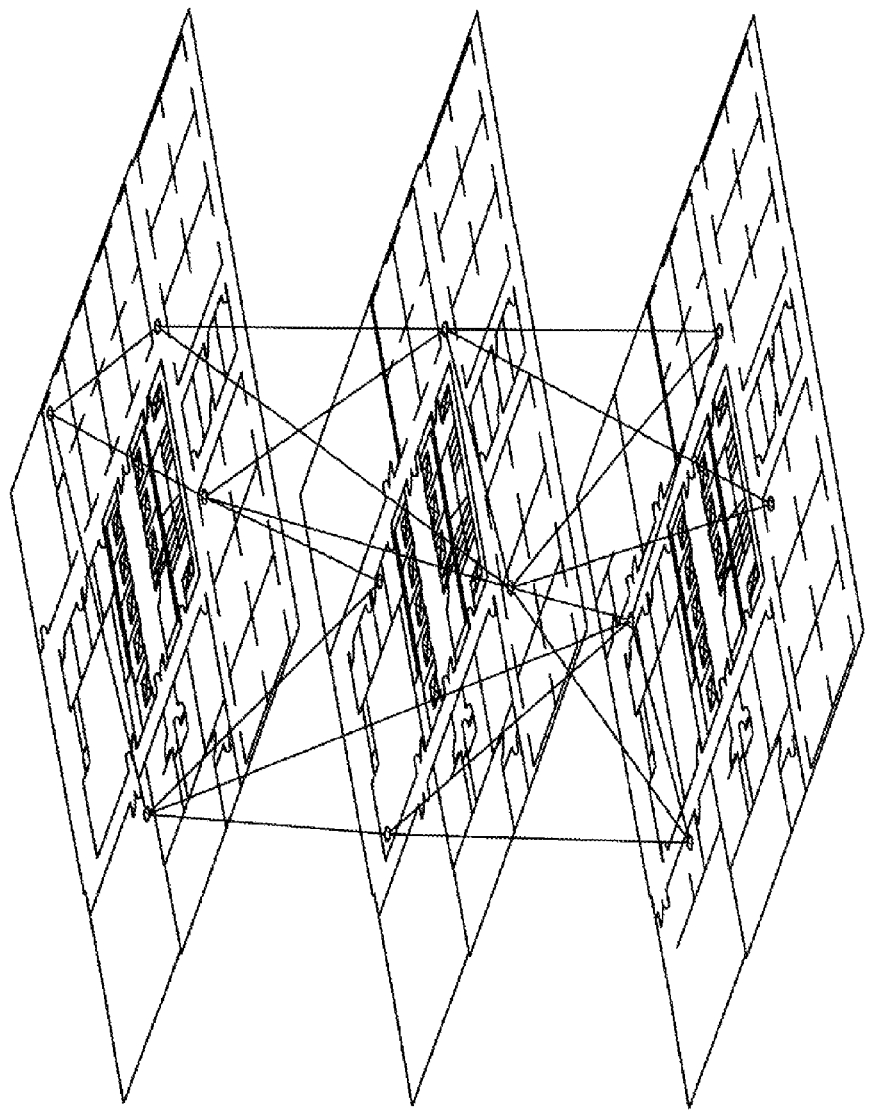
FIG. 7 illustrates a three-dimensional grid of imaging devices superimposed on a multi-level floor plan.

In the case of a multi-story building, each imaging device may detect other imaging devices above, below, or on the same floor of the multi-story building. MPS location server 130 may create a three-dimensional grid that plots the relative locations of each imaging device. MPS location server 130 may then overlay the three-dimensional grid to the multiple levels of the building, as shown for example in FIG. 7.

In one example embodiment, MPS location server 130 may be capable of sending updated accurate geospatial location information to each imaging device. Each imaging device may be configured to accept and internally store the geospatial location information and provide the information upon network query.

In another example embodiment, MPS location server 30 may be connected directly to a wide area communication network for communication with an MPS provider's server. MPS location server 130 may communicate the list of imaging devices and location data to the MPS provider's server so as to allow the MPS organization to be aware of the statuses of the imaging devices in the customer location at any given time.

In another example embodiment, the disclosed systems and methods may also be implemented as a web service that may allow users, other than service technicians, to retrieve building floor plans which indicate the locations of various imaging devices within the user location. In one example aspect, users may retrieve the floor plans via their workstations, laptops, mobile devices, or any other device that can display floor plan images on a screen.

The above example embodiments thus provide a "location aware" imaging device ecosystem. Movements of the imaging devices within the ecosystem are detected without requiring external access points, readers or gateways. In other words, the imaging devices rely on themselves to detect and track each other. Moreover, the above embodiments also provide real-time visibility of exact locations of imaging devices in a customer location.

Figure 8:
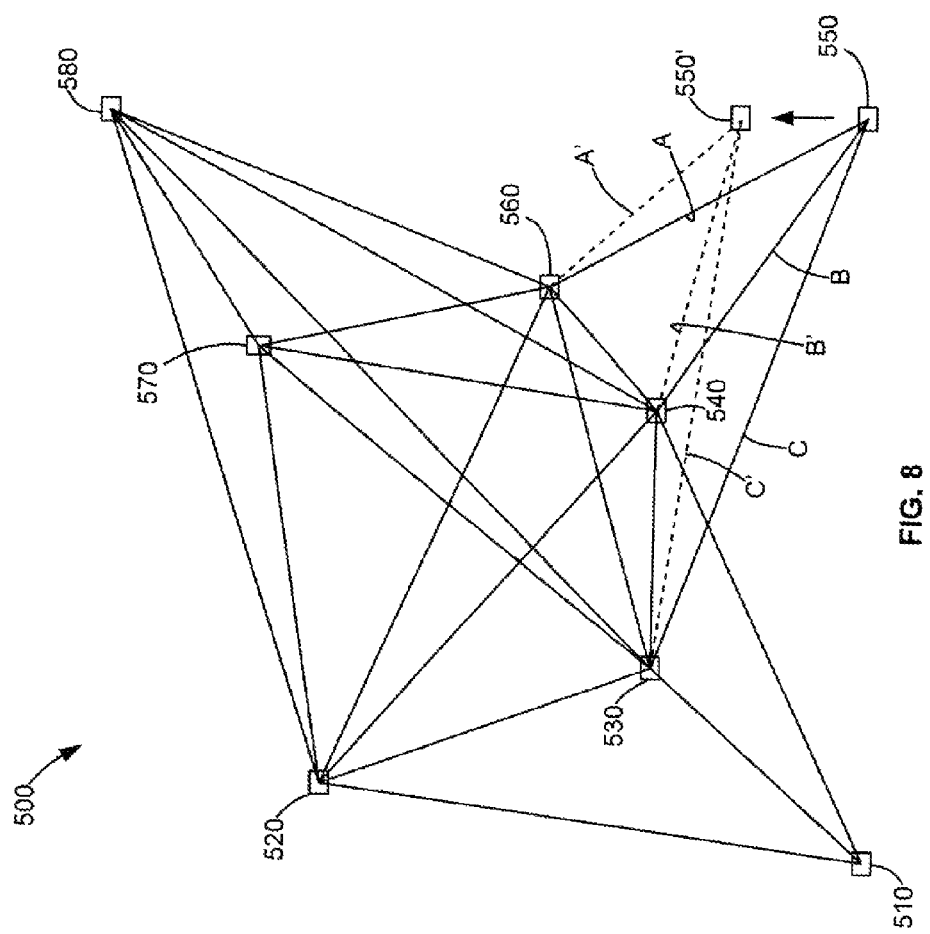

Thereafter, the radio devices may remain in a movement sensing condition. If an imaging device is moved, the radio devices attached to the neighboring imaging devices may detect its movement and respectively perform ranging calculations. The radio device of the relocated imaging device may also perform its own ranging calculations at its new location. For example, FIGS. 8 and 9 show imaging device 550 of FIGS. 5 and 6 having been moved from a first location to a second location at 550'. In turn, the imaging devices 530, 540 and 550 communicate with one another by radio (dashed lines) to establish ranging information or position data, as before. As the new position data reveals that imaging device 550 has moved locations, the imaging devices pass their updated ranging information to MPS location server 130 for processing. As is seen, the distance between the imaging device at location 550' is closer to each of the imaging devices 530, 540 and 560 than is the imaging device 550 at its initial location, e.g., distance arrows A', B' and C' are shorter than distance arrows A, B and C, respectively. In radio transmission and reception, the time of flight (TOF) and round trip time (RTT) of signals to and from the imaging device at location 550' are faster than they were for the imaging device 550 in its original location. Similarly, the strength of signal is also stronger as the devices are now closer to one another. Other metrics are also available to observe distance relationships as earlier discussed. In turn, MPS location server recalculates the locations of the imaging devices using the ranging information reported by each imaging device. MPS location server 130 recreates the grids or models that indicate the new relative locations of the imaging devices with respect to each other and overlays them on the floor plan. As such, MPS location server may only need to perform updates on the locations of each imaging device with respect to the floor plan and their respective geospatial coordinates (absolute location) once changes in relative locations are detected by the radio devices of the imaging devices in the customer location.

The description of the details of the example embodiments have been described using imaging devices in a customer location. However, it will be appreciated that the teachings and concepts provided herein may also be applicable to track or monitor other assets that are normally connected to the network, such as, for example, workstations and servers.

Many modifications and other embodiments of the disclosure set forth herein will come to mind to one skilled in the art to which these disclosures pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes off limitation.

The invention claimed is:

1. A method for tracking location of a plurality of imaging devices in a computing system environment, comprising:
    receiving, at a first imaging device of the plurality of imaging devices, at least one broadcast signal from at least one other imaging device of the plurality of imaging devices;
    generating position data associated with the at least one other imaging device using the received at least one broadcast signal;
    transmitting the position data from the first imaging device, to a server, wherein the server creates a multi-dimensional map of initial locations of each of the at least one other imaging device relative to the first imaging device based on the position data;
    upon movement of the at least one other imaging device from the initial location to a second location, receiving at the first imaging device another broadcast signal from the at least one other imaging device at the second location;
    generating second position data associated with the at least one other imaging device;
    transmitting the second position data from the first imaging device to the server; and
    redrawing the multi-dimensional map to show the new location of the at least one other imaging device at the second location.

2. The method of claim 1, wherein the server calibrates the multi-dimensional map of locations with geospatial coordinates.

3. The method of claim 1, wherein the generating the position data and the second position data includes calculating respective distance of the at least one other imaging device from the first imaging device.

4. The method of claim 2, wherein the server is initialized with a floor plan calibrated with the geospatial coordinates and calibrates the multi-dimensional map of initial locations with the geospatial coordinates by superimposing the multi-dimensional map of initial locations with the floor plan.

5. The method of claim 4, wherein the first imaging device is calibrated to the floor plan such that the server is initially aware of the location of the first imaging device.

6. The method of claim 1, wherein the multi-dimensional nap of initial locations includes a two-dimensional model of imaging device locations.

7. The method of claim 1, wherein the multi-dimensional map of initial locations includes a three-dimensional model of imaging device locations.

8. A method for tracking location of a plurality of imaging devices, comprising:
    initializing a server with a site floor plan;
    receiving, at the server, ranging information transmitted by one or more imaging devices of the plurality of imaging devices;
    creating a multi-dimensional map of initial locations of the plurality of imaging devices based on ranging information;
    calibrating the multi-dimensional map of initial locations to the site floor plan;
    upon movement of one of the imaging devices from an initial location to a second location, receiving second ranging information at the server from the one or more imaging devices; and
    updating the multi-dimensional map to show the second location of the one of the imaging devices.

9. The method of claim 8, wherein the initializing the server with the site floor plan includes calibrating the floor plan with geospatial coordinates.

10. The method of claim 8, wherein the ranging information and the second ranging information includes distance estimations of the plurality of imaging devices with respect to each other.

11. The method of claim 8, wherein the calibrating the multi-dimensional map to the site floor plan includes overlaying the multi-dimensional map on the site floor plan.

12. The method of claim 8, further including, by the server, determining an absolute location for each of the imaging devices.

13. The method of claim 12, further including transmitting a respective said absolute location from the server to said each of the imaging devices, said each of the imaging devices storing in memory the respective said absolute location sent from the server and being responsive to queries over a network to provide the respective said absolute location.

14. A system for self-locating imaging devices in an imaging environment, comprising:
    a plurality of imaging devices equipped with radio transceivers to allow each of the plurality of imaging devices to communicate with each other via radio signals and calculate distance estimations relative to each other based on the radio signals exchanged with each other; and
    a server connected to the plurality of imaging devices, the server operative to receive the distance estimations from the plurality of imaging devices, and create a multi-dimensional map of locations of the plurality of imaging devices based on the calculated distance estimations, including being operative to receive second or more distance estimations from the plurality of imaging devices to update the multi-dimensional map to show movement of locations of at least one imaging device from an initial to a second location.

15. The system of claim 14, wherein the server is initialized with a site floor plan calibrated with geospatial coordinates.

16. The system of claim 15, wherein at least one imaging device of the plurality of imaging devices is calibrated to the site floor plan such that the server is initially aware of the location of the at least one imaging device prior to creating the multi-dimensional map.

17. The system of claim 15, wherein the server is further operative to calibrate the multi-dimensional map to the site floor plan and the geospatial coordinates.

18. The system of claim 16, wherein the server calibrates the multi-dimensional map to the site floor plan by overlaying the multi-dimensional map on the site floor plan.

19. The system of claim 14, wherein the multi-dimensional map includes a two-dimensional model showing locations the plurality of imaging devices relative to each other.

20. The system of claim 14, wherein the multi-dimensional map includes a three-dimensional model showing locations of the plurality of imaging devices relative to each other.

\* \* \* \* \*